(12) United States Patent
Franklin

(10) Patent No.: US 12,480,802 B1
(45) Date of Patent: Nov. 25, 2025

(54) LOAD CELL BUSHING

(71) Applicant: Amazon Technologies, Inc., Seattle, WA (US)

(72) Inventor: Nicholas Franklin, Framingham, MA (US)

(73) Assignee: Amazon Technologies, Inc., Seattle, WA (US)

( * ) Notice: Subject to any disclaimer, the term of this patent is extended or adjusted under 35 U.S.C. 154(b) by 532 days.

(21) Appl. No.: 18/081,498

(22) Filed: Dec. 14, 2022

(51) Int. Cl.
*G01G 3/14* (2006.01)
*G01G 21/10* (2006.01)
*G01G 21/23* (2006.01)

(52) U.S. Cl.
CPC ........... *G01G 3/1402* (2013.01); *G01G 21/10* (2013.01); *G01G 21/23* (2013.01)

(58) Field of Classification Search
CPC ....... G01G 3/1402; G01G 21/10; G01G 21/23
USPC .......................................................... 177/211
See application file for complete search history.

(56) References Cited

U.S. PATENT DOCUMENTS

| | | | | |
|---|---|---|---|---|
| 4,094,368 A * | 6/1978 | Sann | ...................... | G01G 23/14 177/187 |
| 4,778,017 A * | 10/1988 | Liang | ...................... | G01G 21/10 177/187 |
| 6,484,593 B2 * | 11/2002 | Lehtovaara | ............... | G01L 5/10 73/862.637 |
| 9,117,106 B2 | 8/2015 | Dedeoglu et al. | | |
| 9,235,928 B2 | 1/2016 | Medioni et al. | | |
| 9,473,747 B2 | 10/2016 | Kobres et al. | | |
| 10,466,095 B1 * | 11/2019 | O'Neill | .................. | G01G 19/42 |
| 2011/0127091 A1 * | 6/2011 | Shepherdson | ........... | G01G 3/08 177/211 |
| 2013/0284806 A1 | 10/2013 | Margalit | | |

FOREIGN PATENT DOCUMENTS

WO    WO-2017175168 A1 * 10/2017 ........... G01G 23/005

* cited by examiner

*Primary Examiner* — Jacques M Saint Surin
(74) *Attorney, Agent, or Firm* — Kilpatrick Townsend Stockton LLP

(57) ABSTRACT

A bushing for a load cell that reduces assembly height and measurement error and enables tool-less insertion and removal to a mount hole of a load cell and to connect with a load bearing surface of a weight system is described herein. The bushing may include a first end having a tapered surface for inserting into a mounting hole of a load plate. The bushing also includes a second end and a middle portion. The middle portion has a diameter less than the first end and the second end. The bushing defines an internal passageway with fins arranged along the inside thereof. The fins are disposed at an angle with respect to a radius of the internal passageway. The fins may interface with a pin to couple to a load bearing plate of a weight sensor system.

20 Claims, 6 Drawing Sheets

LOAD CELL BUSHING

BACKGROUND

Retailers, wholesalers, and other product distributors typically maintain an inventory of various items that may be ordered, purchased, leased, borrowed, rented, viewed, and so forth, by clients or customers. For example, an e-commerce website may maintain inventory in a fulfillment center. When a customer orders an item, the item is picked from inventory, routed to a packing station, packed, and shipped to the customer. Likewise, physical stores maintain inventory in customer accessible areas, such as in a shopping area, and customers can pick items from inventory and take them to a cashier for purchase, rental, and so forth.

Many physical stores also maintain inventory in a storage area, fulfillment center, or other facility that can be used to replenish inventory located in the shopping areas or to satisfy orders for items that are placed through other distribution pathways (e.g., e-commerce). Other examples of entities that maintain facilities holding inventory include libraries, museums, rental centers, and so forth. In each instance, for an item to be moved from one location to another, it is picked from its current location and transitioned to a new location. It is often desirable to monitor quantity of inventory at various places within the facility. Weight sensors are used in many applications to determine weight on an accessory such as a platform, hook, bin, and so forth.

BRIEF DESCRIPTION OF THE DRAWINGS

The detailed description is described with reference to the accompanying drawings. In the figures, the left-most digit(s) of a reference number identifies the figure in which the reference number first appears. The use of the same reference numbers in different figures indicates similar or identical components or features.

DETAILED DESCRIPTION

Figure 1:
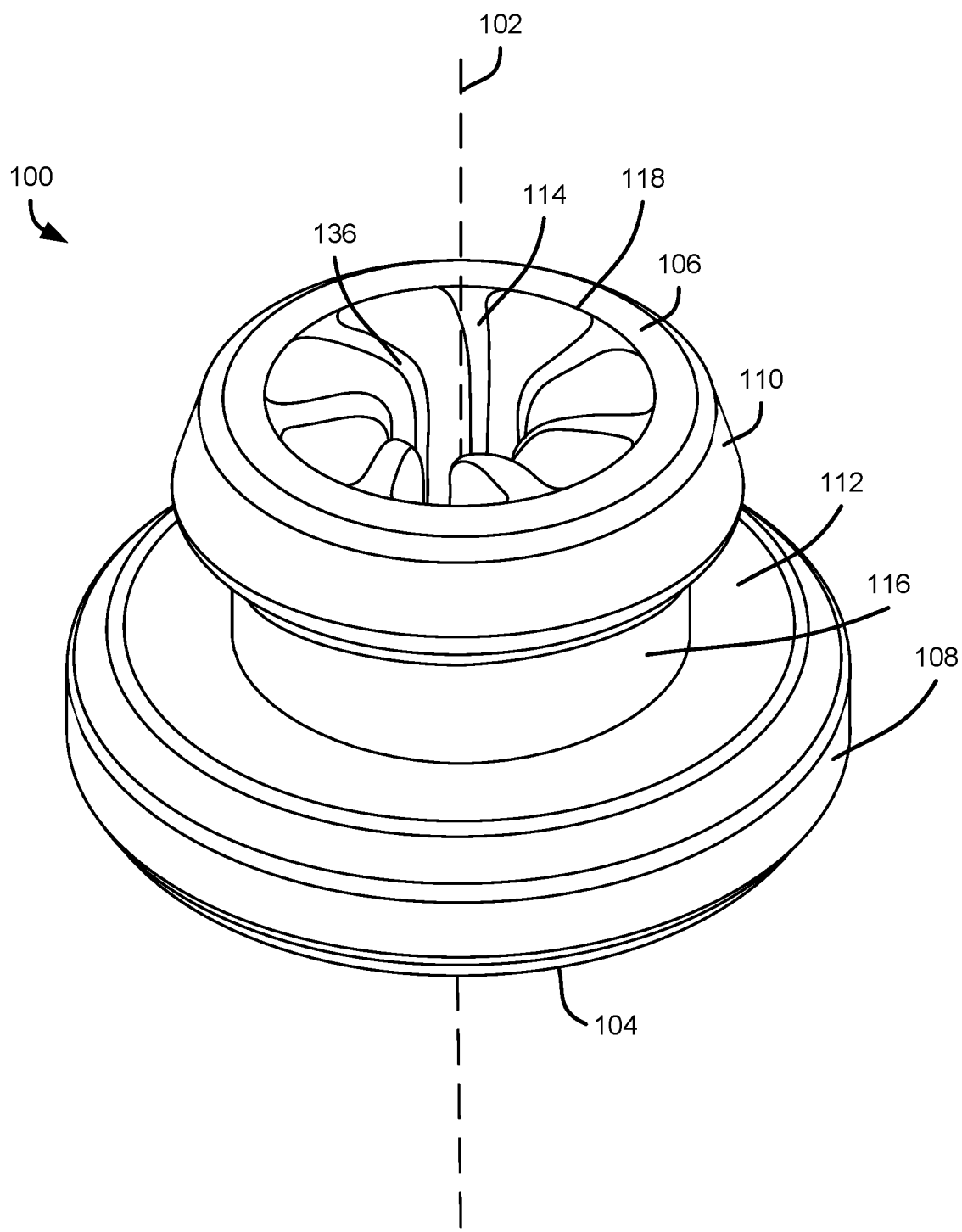
FIG. 1 illustrates a perspective view of an example bushing for use with load cell systems and other such systems, according to at least one example.

Described herein are, among other things, examples of bushings for coupling to load cells to isolate the load cell from vibrations while also preserving a low-profile for compact use cases and scenarios. In some environments, such as retail environments, load cells used in scales must be National Type Evaluation Program (NTEP) compliant to support sell-by weight transactions, for example of produce, food products, and other such items. Scales and other weighing equipment that are NTEP approved have been tested and evaluated to ensure they meet all government standards and requirements.

The examples described herein provide for a weight sensor (e.g., scale), produced using load cells and the bushings described herein to provide a low-profile (e.g., low thickness) weight sensor that may be implemented in environments or scenarios (such as on mobile totes or carts used by customers) where the height or thickness of the weight sensor may become obtrusive to use of the cart or environment. This may also preserve space on the device for other components such as batteries, totes, interfaces, displays, and the like.

Typical approaches to such weight sensors typically employ a single-point load cell or three or more planar beam load cells with thick rubber isolators installed between the load cells and the load bearing platform to isolate vibrations between the load bearing platform and the load cells. However, the typical approach results in a weight sensor that is bulky and tall and may intrude in certain environments or occupy space that may instead be used for other components to further improve the functionality of the system. In particular, the bushings described herein provide for an effective height reduction of up to seventy percent or more.

Planar beam load cells, and other load cells, include transducers that convert force or weight into an electrical signal by way of strain gauges. When a load is applied to the load cell, the body of the load cell flexes due to the elastic properties of the metal material that it is made from. In some examples, planar beam load cells used in groups of 3 or more to keep load on load cells normal to the load cells for accuracy. In some examples, a piezoelectric transducer may be used in place of a planar beam load cell or other load cells. A piezoelectric transducer may use substantially less electrical power than a comparable load cell using strain gauges.

Traditionally, accurate scales composed of planar beam load cells have relied on relatively tall, compliant, rubber vibration dampers (isolators) to help normalize forces imparted by a loads applied to the scale's platform. These isolators, while effective, add significant overall height to the scale module.

The bushing described herein may result in reduced height by using space above, below, and through the load cell instead of typical configurations that place the isolator bushing entirely or nearly entirely above the load cell. Additionally, the bushing may also require less hardware to couple the load bearing platform to the load cell and base. The bushing may be configured to press into a hole of the load cell and be retained by the features and geometry of the bushing within the hole of the load cell. The bushing also includes a passage through the middle of the bushing that receives a pin of connector from the load bearing platform and may resist removal of the pin, thereby enabling tool-less insertion and/or removal of the load bearing platform from the load cell for service, cleaning, or other operations without requiring time and complexity of removing hardware to separate the load bearing platform from the load cell.

This bushing optimizes for reduced height by taking advantage of the space above, below, and through the load cell instead of placing all of the hardware and isolator above the load cell. The bushing also eliminates the need for fastening hardware which reduces cost, complexity, part tolerance, and weight while increasing the speed and ease of assembly.

The bushing may be made from a compliant material such as silicone, rubber, thermoplastic polyurethane, or other such material, including vibration damping materials. The bushing may be pressed into the isolator mounting hole on the load cell and is retained due to the geometry of the bushing. Within the bushing, an array of internal fins are arranged and run through the bushing and allows pins fastened to the load bearing platform to be retained inside of the bushing and resist removal as the load bearing platform moves with loads. The internal fins allow the pins connected to the load bearing plate to be inserted and removed without hardware or tools, enabling simple disassembly and assembly that is tool-less for cleaning, maintenance, or other such actions. The compliance or flex in the internal fins allows the pins to deflect without imparting significant side-loads onto the load cells. Therefore, the bushing reduces non-normal loads applied to the load cells.

The internal fins may, in some examples, be radial and directed towards the center of the bushing (e.g., along the axis of the bushing). In some examples, the internal fins may be angled such that the angle of the fins is offset from a radial line extending from the axis by a non-zero angle such as five degrees, ten degrees, twenty degrees, or more. The angle of the fins may bias the fins to preferentially deflect in a direction, and thereby prevent loading the fins until buckling would occur, but instead to provide a consistent resistance against the non-normal forces applied to the bushing.

In some examples, the fins may have a base with a first thickness at the internal surface of the bushing and a distal end with a second thickness that may be equal to or less than the first thickness. The fins may be fine-tuned (e.g., based on material, durometer, first thickness, second thickness, height of fins, etc.) to accommodate different loadings and scenarios. The materials of the fins and the bushings may be selected based on properties for a particular target operating range, e.g., for refrigerated versus room temperature operation. The size of the fins (e.g., the height of the fins measured from the interior surface toward the center of the bushing) may be changed to adjust friction between the pin connected to the load bearing plate to resist removal to varying degrees based on intended used.

In some examples, the bushing may be made of a material such as a rubber, thermoplastic, silicone, or other such material. In some examples, the bushing may be formed of a composite of materials, such as with the fins formed of a first material with first properties, for example to increase or decrease friction against the pin, while the remainder of the bushing may be formed of a second material with properties for vibration isolation.

The bushing has a first end that may be cylindrical, cylindrical with a tapered end and/or may be frusto-conical in shape with the passage including the internal fins along a center of the first end. A second end may be cylindrical, cylindrical with a tapered end, and/or frusto-conical in shape. The tapered ends and/or frusto-conical shapes may improve the ability to press the pushing into a mounting hole on the load cell. In some examples, the first end and/or the second end may be larger than the other. In some examples, the first end and the second end may be the same or approximately the same in diameter. A middle portion between the first end and the second end may be smaller in diameter than the first end and the second end and may be cylindrical in shape such that the first end may be pressed through the mounting hole with the middle portion retained in the mounting hole due to the geometry of the bushing. The faces of the first end and the second end that face the middle portion may contact the mounting plate of the load cell to retain the bushing in place and resist movement of the bushing from the mounting plate.

The bushing design may not only neutralize off-axis loads on the load cells, but also enable a tool-less removal of the load bearing platform as described herein. The load bearing platform can be pressed into place and manually removed with sufficient force. The force required to insert and remove the bushing and/or the load bearing platform may be great enough to prevent the platform coming loose during normal use, but also not so great as to require a force that overloads the load cells when it needs to be removed. The shape and material of the bushing and the fins may therefore be tuned to keep the force required for insertion and removal in the zone described above.

In some examples, the bushing may be formed of a skin or inflatable material that is filled with a fluid such as air, gas, liquid, or other such fluid. The bushing may therefore have a rubber outer layer that forms the outer layer as well as the fins while an interior of the bushing may be filled with a selected fluid for vibration damping and isolation.

One example includes a load measurement system also includes a load bearing portion to receive an item to weigh. The system also includes a base configured to rest on a supporting surface and support the load measurement system and a load cell coupled to the base, the load cell may include a planar beam load cell. The system also includes a bushing removably coupleable with the load cell, the bushing also removably coupleable with the load bearing portion. The bushing may include a body extending along an axis, the body defining a passage extending along the axis, a first portion adjacent a first end of the body along the axis, a second portion adjacent a second end of the body along the axis, and a third portion positioned between the first end and the second end. The third portion has a third cross-sectional area less than a first cross-sectional area of the first end or a second cross-sectional area of the second end and the bushing is retained within an opening of the load cell by the first portion and the second portion. The bushing also includes a plurality of fins on an interior surface of the body, along the passage, the plurality of fins positioned at a non-zero angle with respect to a radial line extending from the axis towards the interior surface.

Examples may include one or more of the following features. The first portion may include a tapered edge around a perimeter of the body configured to aid in fitting the first portion through the opening in the load cell, and where the first cross-sectional area is less than the third cross-sectional area. The bushing may be coupled to the load bearing portion through a pin connected to the load bearing portion, the pin insertable into the passage to contact the plurality of fins of the bushing. The load bearing portion may be configured to be connected to the base using a tool-less insertion of the pin into the passage of the bushing, where the plurality of fins are configured to deform to isolate non-normal loads from the load cell.

One example includes a bushing for a load cell. The bushing includes a first portion having a first diameter at a first end along an axis of the bushing. The bushing also includes a second portion having a second diameter at a second end along the axis. The bushing includes a third portion having a third diameter positioned along the axis between the first portion and the second portion, where the first portion, the second portion, and the third portion define an internal passageway through the bushing along the axis. The bushing includes a plurality of fins on an interior surface of the internal passageway, the plurality of fins positioned at a non-zero angle with respect to a radial line extending from the axis towards the interior surface.

Examples may include one or more of the following features. A representative fin of the plurality of fins may include a base portion and a distal portion, the base portion having a first thickness greater than a second thickness of the distal portion. The plurality of fins may extend a first distance from the interior surface towards a center of the bushing, where a second distance from distal ends of the fins to the center of the bushing is less than or equal to a radius for a connection element to an external component. The plurality of fins may extend along a length of the bushing in a direction parallel to the axis. The first portion may include a tapered first end for tool-less insertion and removal into an opening. The first portion may include a frusto-conical shape. The plurality of fins may be distributed evenly around the interior surface. The bushing may be formed from a vibration damping material. The bushing may include a hollow body filled with a fluid.

The systems and methods described herein provide numerous benefits over typical load cells and load cell bushings, including a low-profile for the overall weight sensor system, tool-less installation and removal that enables simplified manufacturing, assembly, cleaning, and maintenance.

Having now discussed examples of the systems described herein, FIG. 1 illustrates a perspective view of a bushing 100 for use with load cell systems and other such systems, according to at least one example. The bushing 100 is aligned along an axis 102 that may pass through a center of the bushing 100. The axis 102 may define a rotation axis of the bushing 100 around which the bushing 100 may be symmetric. The bushing 100 may be used with a load cell such as shown and described with respect to FIGS. 4-6.

The bushing 100 has a first end 104 and a second end 106 with a middle portion 116. The first end 104 may have a cylindrical shape with an outer perimeter 108. The first end 104 may have tapered and/or rounded corners on either end of the cylindrical portion. The first end has a support surface 112 that may contact a mounting plate of the load cell when the bushing 100 is inserted into a mount hole of a load cell. The outer perimeter 108 may have a diameter that is larger than a diameter of the second end 106. In some examples, the first end 104 and the second end 106 may, in some examples have the same diameter.

The second end 106 of the bushing 100 may have a tapered or frusto-conical shape that tapers over a tapered surface 110 to a narrow end at the second end 106. The narrow end and the tapered surface 110 may enable the bushing 100 to be inserted into a mounting hole of a load cell.

The bushing 100 defines an internal passage 118 where a plurality of fins 114 are arranged. The plurality of fins 114 extend from the surface of the internal passage 118 towards the center of the bushing 100. In some examples, the plurality of fins 114 may extend towards the axis 102. In some examples, the plurality of fins 114 may be arranged to extend toward a center of the internal passage 118 at a non-zero angle with respect to a radial line from the axis 102 to the internal passage 118 surface, as shown and described in FIG. 2.

Within the bushing, the plurality of fins 114 are arranged and run through the bushing 100 along the internal passage 118 parallel with the axis 102 and allows pins fastened to the load bearing platform to be retained inside of the bushing 100 and resist removal as the load bearing platform moves with loads. The plurality of fins 114 allow the pins connected to the load bearing plate to be inserted and removed without hardware or tools, enabling simple disassembly and assembly that is tool-less for cleaning, maintenance, or other such actions. The compliance or flex in the plurality of fins 114 allows the pins to deflect without imparting significant side-loads onto the load cells. Therefore, the bushing 100 reduces non-normal loads applied to the load cells.

The plurality of fins 114 may, in some examples, be radial and directed towards the center of the bushing 100 (e.g., along the axis 102 of the bushing 100). In some examples, the plurality of fins 114 may be angled such that the angle of the fins is offset from a radial line extending from the axis by a non-zero angle such as five degrees, ten degrees, twenty degrees, or more. The angle of the plurality of fins 114 may bias the fins to preferentially deflect in a direction, and thereby prevent loading the fins until buckling would occur, but instead to provide a consistent resistance against the non-normal forces applied to the bushing.

The plurality of fins 114 may have a first thickness at the base of the fins and a second thickness at the distal ends of the fins. The first thickness may be greater than the second thickness such that the fins taper towards the distal end of the fins. The plurality of fins 114 may have a consistent thickness in some examples across the height of the fins.

The plurality of fins 114 may have a radius 136 and/or shaped corner that enables insertion and/or removal of items such as pins from the internal passage 118. The radius 136 may enable a pin to be inserted into the internal passage 118 without buckling the fins 114. The plurality of fins 114 may include the radius 136 at each end of the bushing 100 (e.g., along the axis 102). In some examples, the radius 136 may be a sharp (e.g., 90-degree) corner or other profile. In some examples, the plurality of fins 114 may taper in height, with the fins 114 having a first height at or near the ends of the bushing 100 and a second height at a middle portion of the bushing 100, the second height greater than the first height.

The middle portion 116 of the bushing 100 has a diameter smaller than a diameter of the first end 104 and the second end 106. The middle portion 116 has a cylindrical shape.

The bushing 100 may be made from a compliant material such as silicone, rubber, thermoplastic polyurethane, or other vibration isolating material. The bushing 100 may be pressed into an isolator mounting hole on the load cell and is retained due to the geometry of the bushing 100. Within the bushing 100, the plurality of fins 114 run through the bushing and allows pins fastened to the load bearing platform to be retained inside of the bushing and resist removal as the load bearing platform moves with loads. The fins allow the pins connected to the load bearing plate to be inserted and removed without hardware or tools, enabling simple disassembly and assembly that is tool-less for cleaning, maintenance, or other such actions. The compliance or flex in the fins allows the pins to deflect without imparting significant side-loads onto the load cells. Therefore, the bushing reduces non-normal loads applied to the load cells.

In some examples, the bushing 100 may be made of a material such as a rubber, thermoplastic, silicone, or other such material. In some examples, the bushing 100 may be formed of a composite of materials, such as with the fins formed of a first material with first properties, for example to increase or decrease friction against the pin, while the remainder of the bushing may be formed of a second material with properties for vibration isolation.

Figure 2:
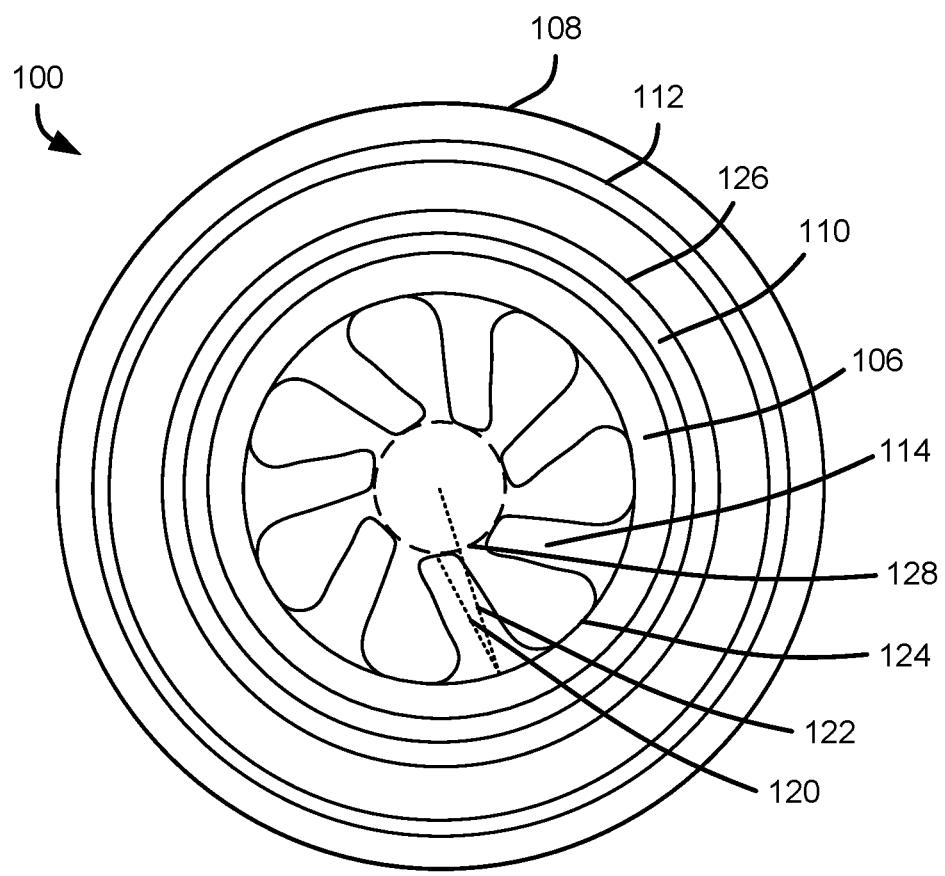
FIG. 2 illustrates a top view of the bushing of FIG. 1.

FIG. 2 illustrates a top view of the bushing 100 of FIG. 1. The bushing 100 has the components described with respect to FIG. 1. As shown in FIG. 2, the bushing 100 shows the diameter 126 of the second end 106 that resists removal of the bushing 100 from a mounting hole. The diameter 126 may be less than a diameter of the outer perimeter 108 of the first end 104.

The fins 114 extend from the perimeter 124 of the internal passage 118 towards a central portion 128 of the internal passage 118. The fins 114 may be aligned with an axis 120 that extends from the perimeter 124 at a non-zero angle with respect to the radius 122 of the perimeter 124. The angle may be greater than one degree, greater or less than five degrees, ten degrees, twenty degrees, or more. The angle of the fins may bias the fins to preferentially deflect in a direction, and thereby prevent loading the fins until buckling would occur, but instead to provide a consistent resistance against the non-normal forces applied to the bushing.

The central portion 128 may be sized with a diameter based on a size of a pin for inserting in the internal passage 118. The diameter of the central portion 128 may be less than a diameter of the pin to be inserted such that the pin deflects the fins 114 when inserted and the friction between the fins 114 and the pin resists removal of the pin.

Figure 3:
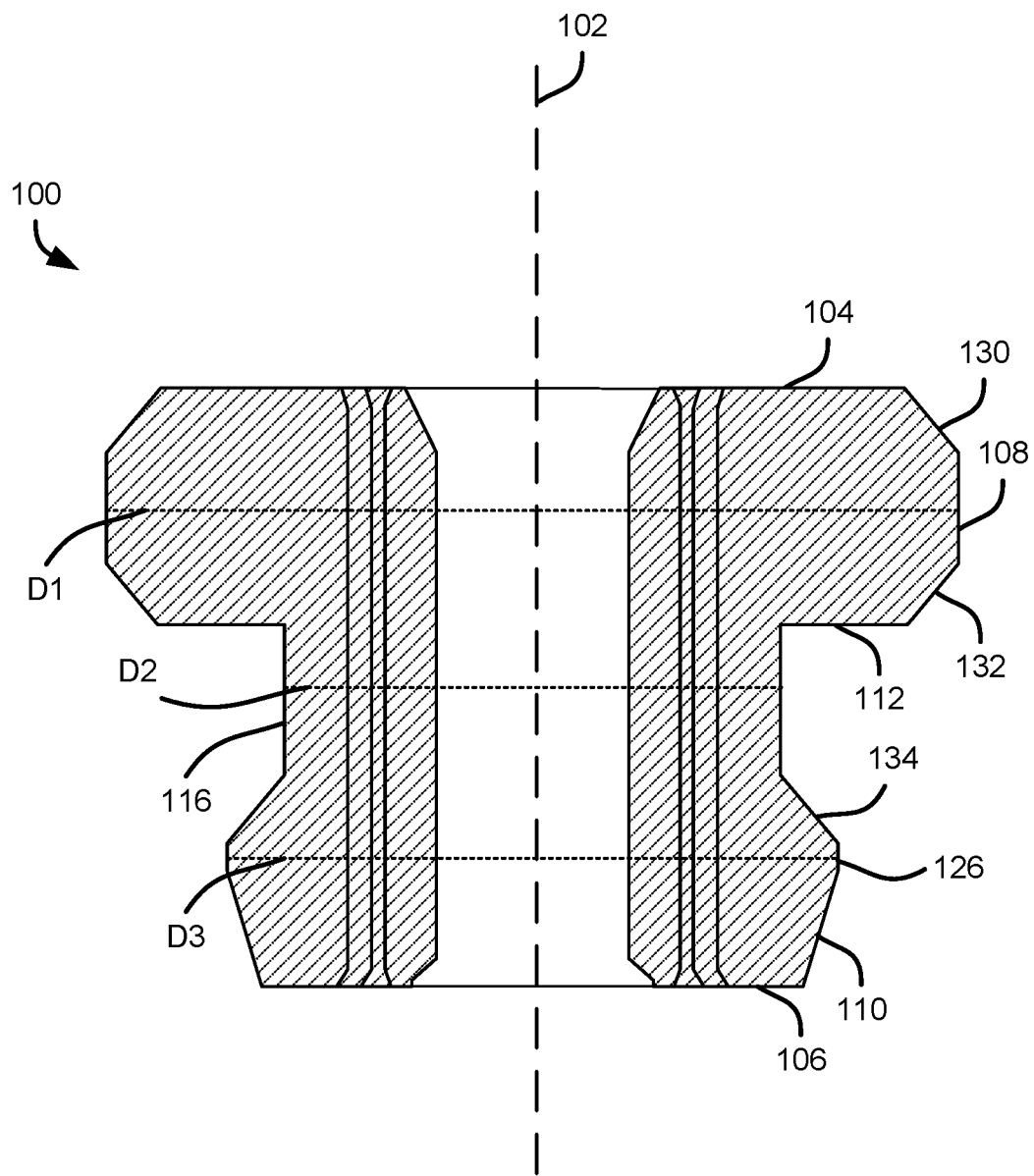
FIG. 3 illustrates a section view of the bushing of FIG. 1.

FIG. 3 illustrates a section view of the bushing 100 of FIG. 1. The section view is taken through the axis 102. The section view shows a first diameter, D1, of the first end 104, a second diameter, D2, of the middle portion 116, and a third diameter D3 of the second end 106. The diameters D1 and D3 may be larger than a mounting hole of the load cell to resist removal of the bushing 100 while also enabling tool-less insertion of the bushing 100 into the mounting hole.

The first end 104 includes rounded corners 130 and 132 as well as tapered surfaces 110 and 134 that may aid in insertion and removal of the bushing 100 from the mounting hole. The support surface 112 and the sloped surface 134 may contact surfaces of the mounting plate of the load cell.

Figure 4:
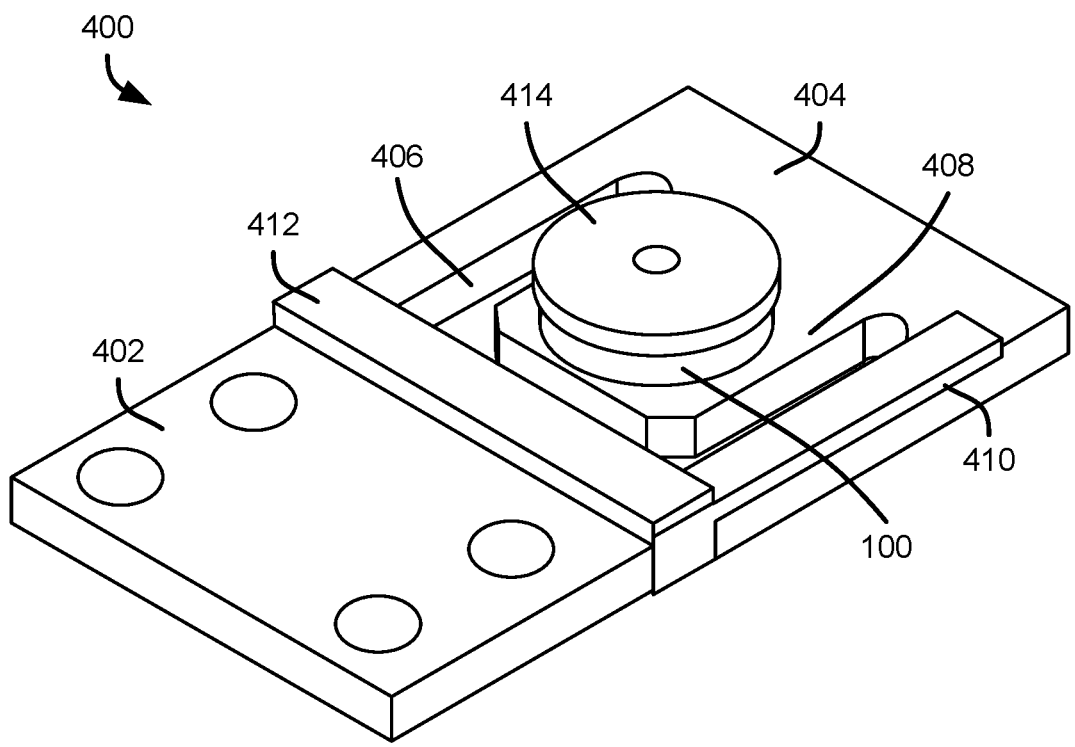
FIG. 4 illustrates a perspective view of an example load cell using a bushing to couple between a load bearing portion and the load measurement portion, according to at least one example.

FIG. 4 illustrates a perspective view of an example load cell 400 using a bushing 100 to couple between a load bearing portion (not shown) and the load measurement portion, according to at least one example.

FIG. 4 illustrates a perspective view of an example load cell 400 using a bushing 100 to couple between a load bearing portion (not shown) and the load measurement portion, according to at least one example.

The example load cell 400 may have a body 402 or structure and one or more transducers and/or strain gauges 410 and 412 that provide information indicative of a force applied to that body 402. The structure of the load cell 400 may include a live end 408 and a fixed end 404. The live end 408 is affixed to a load 414 through the bushing 100 while the fixed end 494 is affixed to a supporting structure, such as the body 402.

In some examples, the load cell 400 may include planar beam load cells. The structure of each planar beam load cell may comprise a flat piece of material, such as metal, having strain concentration features such as slots 406, grooves, and so forth. For example, the flat piece of material may have a "U" shaped cut. The tab formed by the "U" may be the live end 408 while the remaining structure surrounding the "U" is the fixed end 404. A strain gauge 410 and 412 is affixed to a portion of the structure, such as at the point where the tab joins the remainder of the structure. A change in load on the live end 408 results in a deformation of the structure of the load cell which is measured by the strain gauge 410 and 412. Strain gauges 410 and 412 may be electrical, optical, acoustic, or combinations thereof. Output from the strain gauge 410 and 412 may be used to determine weight sensor data indicative of the force that produced the deformation.

Figure 5:
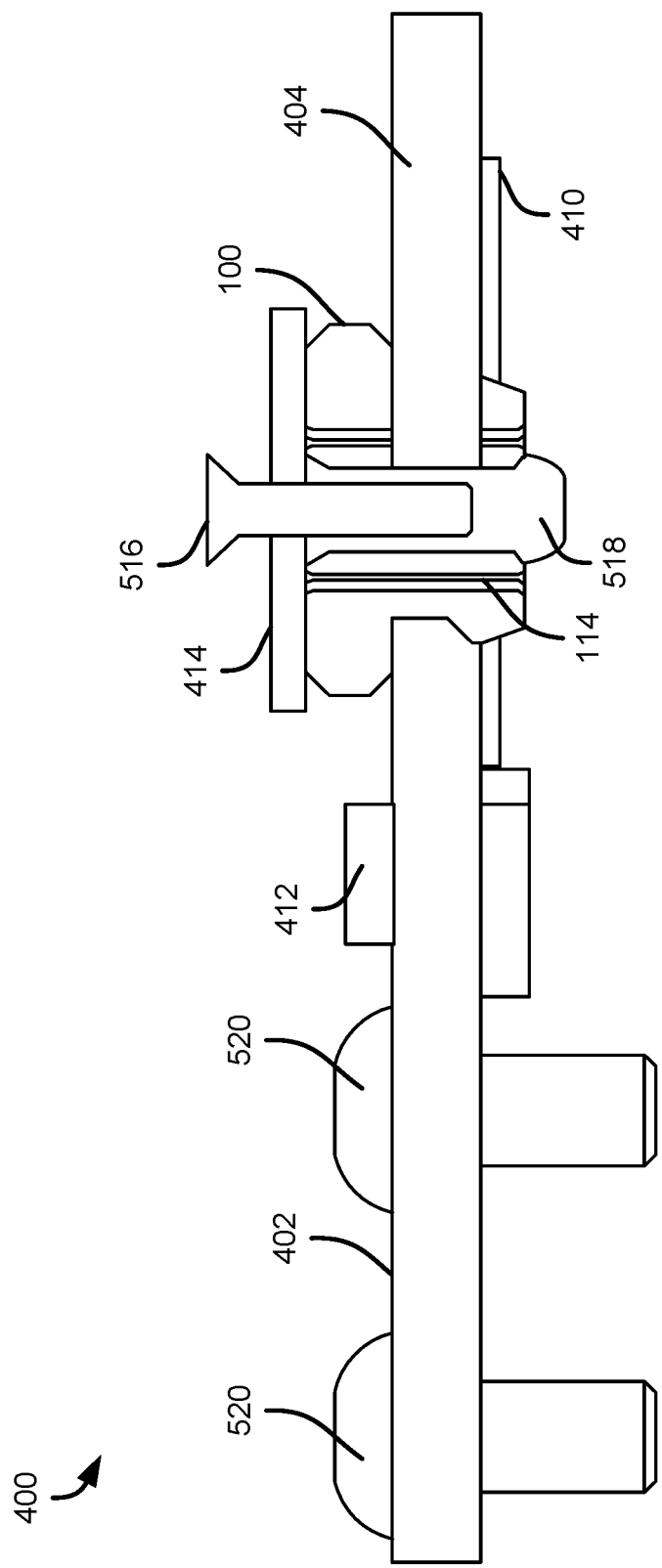
FIG. 5 illustrates a section view of the load cell of FIG. 4.

FIG. 5 illustrates a section view of the load cell 400 of FIG. 4. The load cell 400 is shown with fasteners 520 that may be used to couple the load cell 400 to a base and/or supporting structure.

The load cell 400 is also shown having a pin 518 inserted in the bushing 100 and contacting the fins 114. The pin 518 has a diameter that may be greater than a diameter of a space between the fins 114 such that the pin 518 deforms the fins and the friction of the fins 114 against the pin 518 may resist removal of the pin 518 from the bushing 100. The pin 518 is connected to the load 414 through a fastener 516 that may insert into the top of the pin 518. Therefore, the pin may be easily connected to different load plates 414 and easily assembled. The pin 518 may be removed from the bushing 100 by applying force vertically in FIG. 5 against the load 414, fastener 516, or other such components. The pin 518 may be removed without overloading the strain gauges 410 and 412 of the load cell.

Figure 6:
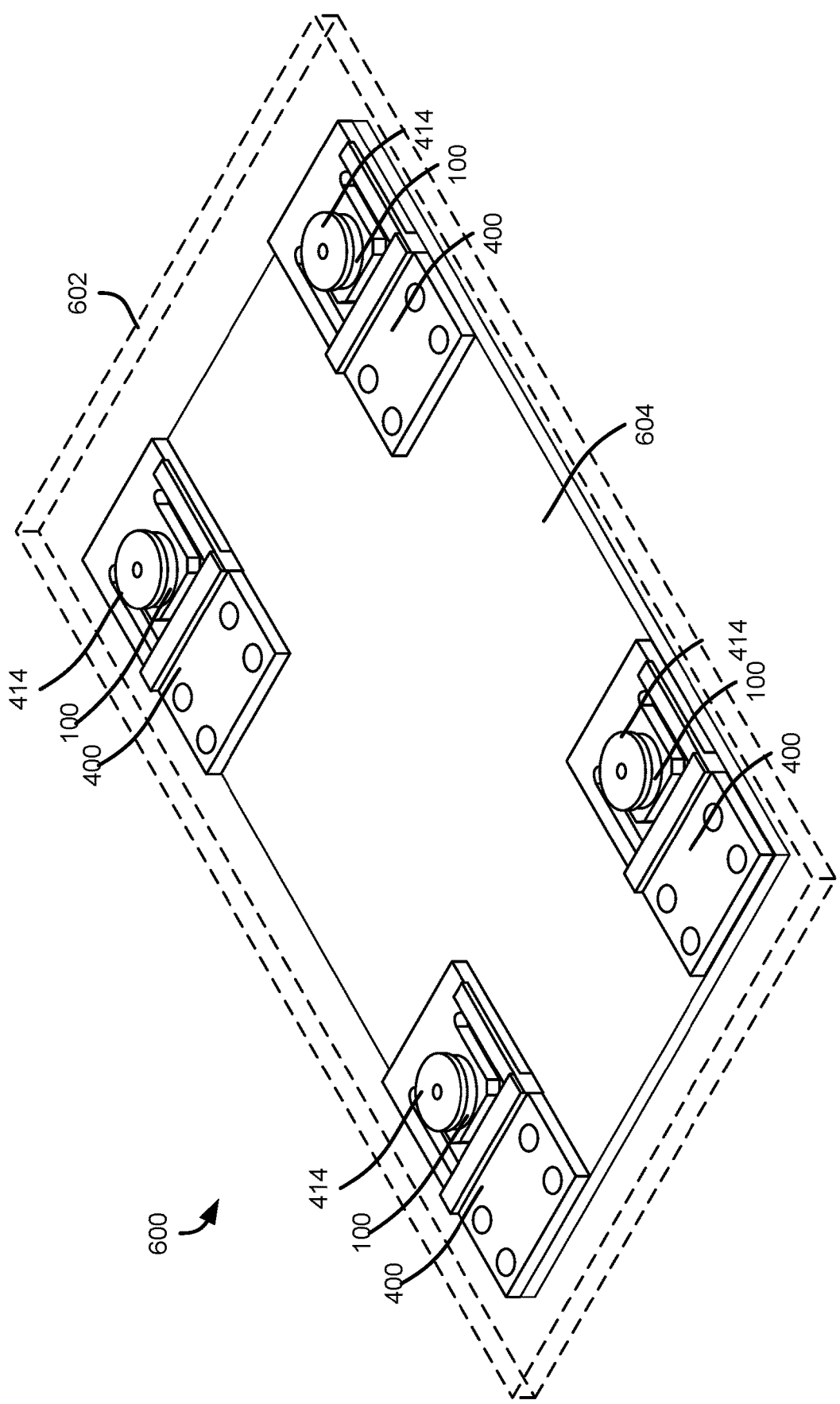
FIG. 6 illustrates a perspective view of a weight measurement system using multiple load cells coupled to a load bearing portion through bushings, according to at least one example.

FIG. 6 illustrates a perspective view of a weight measurement system 600 using multiple load cells 400 coupled to a load bearing portion 602 through bushings 100, according to at least one example. The weight measurement system 600 includes four load cells 400 that may include planar beam load cells. In some examples, the weight measurement system 600 may include three load cells 400 in some examples. The planar beam load cells may use three or more load cells to maintain loads applied to the load cells 400 in a normal direction and to avoid horizontal or side loading on the load cells 400.

The load cells 400 may include the components described with respect to the load cells of FIGS. 4 and 5. The load cells 400 may couple to a load bearing portion 602 through the bushings 100 and the load 414, including through the pins 518 and fasteners 516.

The weight measurement system 600 may include a base 604 to which the load cells 400 may couple. The base 604 may be a component of another system, such as a tabletop, shelf, counter, or other substrate. The base 604 may couple to each of the load cells 400 in the weight measurement system 600 so that the weight is distributed over the load cells 400 and a total weight across the load bearing portion may be determined. The weight may be determined by the strain gauges of the load cells 400 across the weight measurement system 600.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features, it is to be understood that the subject matter defined in the appended claims is not necessarily limited to the specific features described. Rather, the specific features are disclosed as illustrative forms of implementing the claims.

The invention claimed is:
1. A load measurement system comprising:
 a load bearing portion to receive an item to weigh;

a base configured to rest on a supporting surface and support the load measurement system;

a load cell coupled to the base, the load cell comprising a planar beam load cell; and a bushing removably coupleable with the load cell, the bushing also removably coupleable with the load bearing portion, and wherein the bushing comprises:

a body extending along an axis, the body defining a passage extending along the axis;

a first portion adjacent a first end of the body along the axis, a second portion adjacent a second end of the body along the axis, and a third portion positioned between the first end and the second end, wherein the third portion has a third cross-sectional area less than a first cross-sectional area of the first end or a second cross-sectional area of the second end and the bushing is retained within an opening of the load cell by the first portion and the second portion; and a plurality of fins on an interior surface of the body, along the passage, the fins positioned at a non-zero angle with respect to a radial line extending from the axis towards the interior surface.

2. The load measurement system of claim 1, wherein the first portion comprises a tapered edge around a perimeter of the body configured to aid in fitting the first portion through the opening in the load cell, and wherein the first cross-sectional area is less than the third cross-sectional area.

3. The load measurement system of claim 1, wherein the bushing is coupled to the load bearing portion through a pin connected to the load bearing portion, the pin insertable into the passage to contact the plurality of fins of the bushing.

4. The load measurement system of claim 3, wherein the load bearing portion is configured to be connected to the base using a tool-less insertion of the pin into the passage of the bushing, wherein the plurality of fins are configured to deform to isolate non-normal loads from the load cell.

5. A bushing, comprising:

a first portion having a first diameter at a first end along an axis of the bushing;

a second portion having a second diameter at a second end along the axis;

a third portion having a third diameter positioned along the axis between the first portion and the second portion, wherein the first portion, the second portion, and the third portion define an internal passageway through the bushing along the axis; and a plurality of fins on an interior surface of the internal passageway, the plurality of fins positioned at a non-zero angle with respect to a radial line extending from the axis towards the interior surface.

6. The bushing of claim 5, wherein a representative fin of the plurality of fins comprises a base portion and a distal portion, the base portion having a first thickness greater than a second thickness of the distal portion.

7. The bushing of claim 5, wherein the plurality of fins extend a first distance from the interior surface towards a center of the bushing, wherein a second distance from distal ends of the fins to the center of the bushing is less than or equal to a radius for a connection element to an external component.

8. The bushing of claim 5, wherein the plurality of fins extend along a length of the bushing in a direction parallel to the axis.

9. The bushing of claim 5, wherein the first portion comprises a tapered first end for toolless insertion and removal into an opening.

10. The bushing of claim 5, wherein the first portion comprises a frusto-conical shape.

11. The bushing of claim 5, wherein the plurality of fins are distributed evenly around the interior surface.

12. The bushing of claim 5, wherein the bushing is formed from a compliant material.

13. The bushing of claim 5, wherein the bushing comprises a hollow body filled with a fluid.

14. A system, comprising:

a load bearing portion a base a load cell coupled to the base; and a bushing removably coupleable with the load cell and coupleable with the load bearing portion, the bushing comprising:

a first portion having a first diameter at a first end along an axis of the bushing;

a second portion having a second diameter at a second end along the axis;

a third portion having a third diameter positioned along the axis between the first portion and the second portion, wherein the first portion, the second portion, and the third portion define an internal passageway through the bushing along the axis; and a plurality of fins on an interior surface of the internal passageway, the plurality of fins positioned at a non-zero angle with respect to a radial line extending from the axis towards the interior surface.

15. The system of claim 14, wherein a representative fin of the plurality of fins comprises a base portion and a distal portion, the base portion having a first thickness greater than a second thickness of the distal portion.

16. The system of claim 14, wherein the plurality of fins extend a first distance from the interior surface towards a center of the bushing, wherein a second distance from distal ends of the plurality of fins to the center of the bushing is less than or equal to a radius for a connection element to an external component.

17. The system of claim 14, wherein the plurality of fins extend along a length of the bushing in a direction parallel to the axis.

18. The system of claim 14, wherein the first portion comprises a tapered first end for toolless insertion and removal into an opening.

19. The system of claim 14, wherein the bushing is formed from a compliant material.

20. The system of claim 14, wherein the plurality of fins are distributed evenly around the interior surface.

* * * * *